Figure 1:
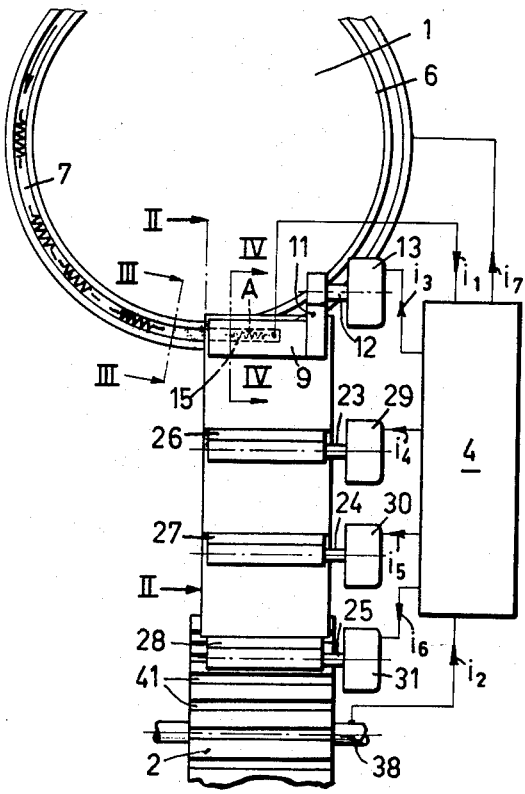

Sept. 21, 1965   W. PONSEN   3,207,287
ARTICLE CONVEYING AND DELIVERING DEVICE
Filed Aug. 2, 1962   2 Sheets-Sheet 1

INVENTOR
WILLEM PONSEN
BY
Frank R. ...
AGENT

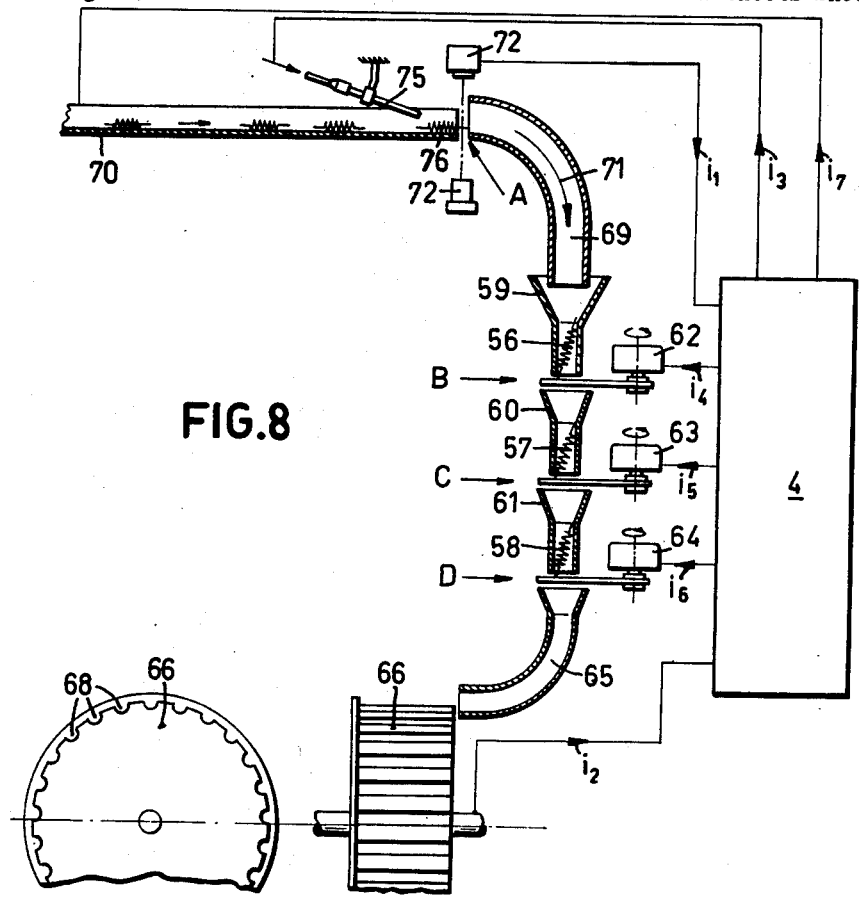
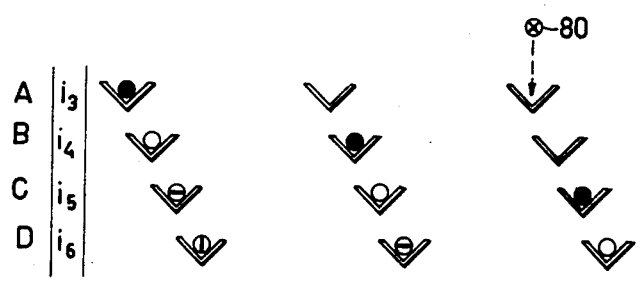
FIG.5  FIG.6  FIG.7
INVENTOR
WILLEM PONSEN 3,207,287
ARTICLE CONVEYING AND DELIVERING DEVICE
Willem Ponsen, Emmasingel, Eindhoven, Netherlands, assignor to North American Philips Company Inc., New York, N.Y., a corporation of Delaware
Filed Aug. 2, 1962, Ser. No. 214,335
Claims priority, application Netherlands, Aug. 28, 1961, 268,697
1 Claim. (Cl. 198—26)

In the mass production of filament lamps with the aid of suitable machines so-called vibrating feeders are frequently used which comprise a helically ascending vibrating path along which the stream of articles, for example, filaments for electric filament lamps, are fed upwards by vibration. With the aid of such feeders each time one of a plurality of randomly disposed filaments may be discharged at the end of the said path. When the spacings between the articles travelling in a stream along such a path are substantially equal, such a vibrating feeder may be used for delivering filaments at equal intervals to a transport roller of a filament lamp machine. If, however, the various filaments on such a feeder are spaced substantially unequally, the stream of articles is irregular and hence not suitable to be supplied as such to a machine adapted to receive a filament at regular intervals.

It is the object of the present invention to provide an apparatus for conveying a plurality of identical articles and for delivering a single article to a holder at equal intervals, in particular for delivering a filament for an electric filament lamp or discharge tube to a transport roller.

For this purpose an apparatus in accordance with the invention is characterized in that it is provided with a starting station situated at the end of a path along which a stream of substantially unequally spaced articles may be fed, with a number of intermediate stations succeeding the starting station, and with a final station adapted to deliver to the holder, if required by way of a conveyer, single articles at equal intervals, said starting and intermediate stations being capable of temporarily holding an article in succession and passing the article on to one another only when a succeeding intermediate station or final station is empty, the apparatus further comprising means for stopping the stream of articles along the path whenever an article of the said stream has entered the starting position and for maintaining the stationary condition until the starting station has delivered the article to the next intermediate station. The intermediate stations effectively form supply stations in which the articles are temporarily stored. Each station is capable of storing only a single article. The use of a number of stations which are capable of delivering their contents only when a succeeding station has been emptied enables an article to be delivered by the final station at desired instants only. In the apparatus in accordance with the invention the stream of articles along the way is intentionally stopped whenever an article of the stream has entered the starting station. The duration of the stationary period is entirely determined by the emptying of the next station.

The fact that the articles are not evenly fed forward may result in that no article has entered the starting station on termination of the delivery cycle of the final station so that in the next delivery cycle the first intermediate station and subsequently even the second intermediate station remain empty.

This drawback is overcome in a further embodiment of the apparatus in accordance with the invention. This embodiment of the apparatus includes a control mechanism which, when the stations containing articles have delivered their contents to succeeding stations and consequently at least one intermediate station has become empty, causes an article having entered the starting station to be passed on to the empty station most remote in the transfer direction. This control mechanism compares the periodically recurring demand of the final station for an article with the fluctuating supply along the path and as a result of this comparison this mechanism is capable of eliminating the deficiency of articles in the intermediate stations in another period when a plurality of comparatively closer spaced articles are supplied along the path.

In a further embodiment of the apparatus in accordance with the invention the means for stopping the stream of articles over the path are provided with members, for example photo-electric members, at least one electric contact or the like, capable of detecting an article arriving at a reference point of the path and of stopping the feeding of the articles over the path.

A preferred embodiment of the apparatus in accordance with the invention is characterized in that it is provided wtih a downwardly directed guide for the articles and with a plurality of partitions arranged one above the other and movable with respect to the guide which in one of their stations together with said guide constitute a number of article stations situated one above the other.

In a final embodiment the starting station is a removable receivable lock arranged at the end of a helically ascending vibrating trough for the objects and is designed so that the entrance of an article therein colses an electric contact to be closed for stopping the vibrating motion.

In order that the invention may readily be carried out, embodiments thereof will now be described, by way of example, with reference to the accompanying diagrammatic drawings, in which—

Figure 3:
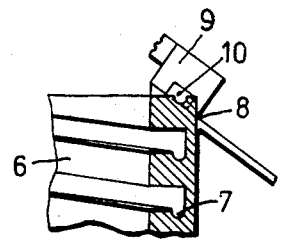
Figure 4:
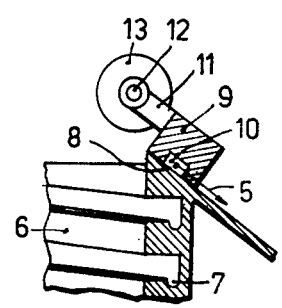
Figure 2:
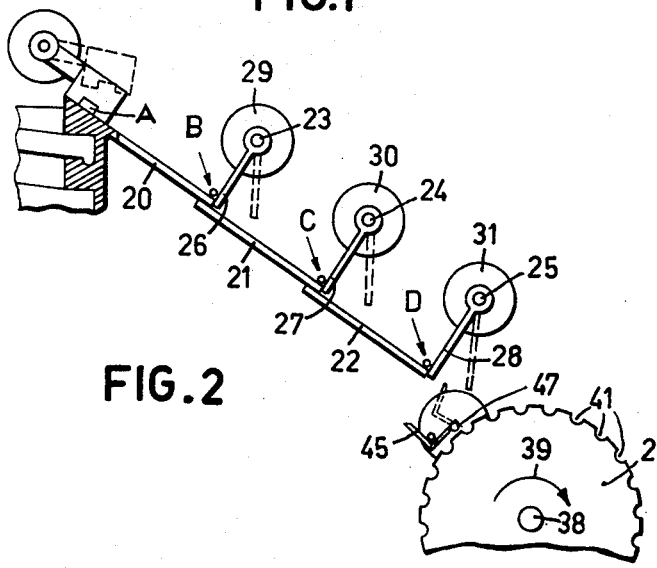

FIGURES 1, 2, 3 and 4 relate to a first embodiment of the apparatus in accordance with the invention. FIGURE 1 is a diagrammatic plan view and FIGURES 2, 3 and 4 are sectional views taken on lines II—II, III—III and IV—IV of FIGURE 1 respectively.

FIGURES 5, 6 and 7 illustrate the operation of the apparatus shown in FIGURE 1.

FIGURE 8 relates to a second embodiment of the apparatus in accordance with the invention.

FIGURES 1 and 2 show a supply container 1, a starting station A, two intermediate stations B and C, a final station D, a transport roller 2 and an electronic control system 4 indicated block-schematically.

The supply container 1, which is a vibrating container, comprises a helically ascending trough 7 supported along a cylindrical wall 6 (FIGURES 3 and 4) by which a stream of articles, for example, filaments for electric filament lamps may be fed forward. The spacings between the filaments in this trough are substantially unequal. The end of the trough is an inclined surface 8 which forms an abutment for a pivotally mounted block 9 provided with a recess 10. The block 9 is connected by an arm 11 to a shaft 12 of a rotary magnet adapted to rotate in a stationary housing 13. In the disposition of the block 9 shown in FIGURE 4 the recess 10 together with the inclined surface 8 forms a starting station A in which an article 15 supplied from the trough 7 may be temporarily accommodated. The article 15 may leave the station A according to the arrow 5 when the block is removed by pivoting. The starting station A is designed so as to transmit a perception signal $i_1$ to the control system 4 on the entrance of the object 15, the vibrating motion of articles along the trough 7 being immediately stopped by a signal $i_7$ produced by the system 4. The starting station A is further designed so that on removal of the article 15 therefrom the vibrating motion is immediately started again until the next article enters the said position.

Three partially overlapping stationary guide members 20, 21 and 22 adjoin the inclined surface 8. The lowermost part of each guide member forms an abutment for partitions 26, 27 and 28 respectively secured to shafts 23, 24 and 25 respectively of rotary magnets mounted for rotation in stationary housings 29, 30 and 31. In the station shown in FIGURE 2 the partitions together with the guide members form three temporary storing stations for single articles. They are positions B, C and D respectively. The rotary magnets disposed in the housings 13, 29, 30 and 31 are electromagnetically energized by signals $i_3$, $i_4$, $i_5$ and $i_6$ respectively produced by the control system. By this energization a partition is once removed from the respective guide member and returned thereto.

The transport roller 2 secured to a shaft 38 of a machine for manufacturing electric filament lamps is capable of intermittent rotation in the direction indicated by an arrow 39. In the circumference of the roller 2 are provided a number of grooves 41 for accommodating articles, for example filaments. By rotating the roller the articles accommodated in the grooves are fed forward intermittently. Between the roller 2 and the final station D is provided an angular receptacle 45 adapted to pivot about a point 47. After each rotation step of the roller 2 the receptacle 45 is pivoted about the point 47 into the station shown in broken lines so that the article it contains is delivered to the groove 41 nearest the pivot point 47. The intermittent rotation of the roller 2 and the emptying of the receptacle 45 are performed in synchronism in a prescribed sequence. Each time the receptacle 45 has discharged its contents it must be filled again from the final station D. In the figure $i_2$ denotes a demand signal applied to the control system 4 after each rotation step of the roller 2. The arrangement is such that the demand signal $i_2$ produced in a prescribed sequence indicates the empty condition of the receptacle 45.

The operation of the apparatus will now be described with reference to FIGURES 5, 6 and 7 also.

Starting from a situation shown in FIGURE 5 in which all stations contain an article, after the receptacle 45 has delivered its contents to the roller 2 a demand signal $i_2$ is transmitted to the system 4. As a result the rotary magnet of the station D is energized by a signal $i_6$ enabling this station to deliver its contents. Then a signal $i_5$ is produced which causes the position C to deliver its contents. Then a signal $i_4$ causes the station B to empty. Finally a signal $i_3$ causes the starting station A to empty. As has been mentioned hereinbefore, emptying of the station A results in the trough 7 to be set into vibration. After the said series of transfers from each station to the lower station and the receptacle 45 respectively, which with the aid of suitable electronic circuits in the control system may be performed very rapidly, that is to say, within the duration of a delivery cycle of the final station D, the intermediate stations B and C are filled again. If in the meantime an article has been supplied by the trough 7, the same process may be repeated in the next delivery cycle.

Starting from the signal $i_2$ the control system 4 successively gives the signal $i_6$, $i_5$, $i_4$ and $i_3$, the stations delivering their contents in this sequence.

However, the articles in the vibrating trough are not equally spaced. Hence, an article may not be fed to the starting station A in time. Consequently after the next series of transfers the station A remains empty in the succeeding delivery cycle of the final position D. The resulting situation is shown in FIGURE 6.

The control system 4 is designed so that in the case of a deficiency in the position A (FIGURE 6) the demand signal $i_2$ does not initiate a complete series of signals $i_6$, $i_5$, $i_4$ and $i_3$. In the case shown in FIGURE 6 signals $i_6$, $i_5$ and $i_4$ only are successively produced. Thus only stations B, C and D containing an article deliver their contents. This results in the situation shown in FIGURE 7 in which stations A and B are empty.

The control system 4 responds not only to the input signal $i_2$ but also to an input signal $i_1$.

If an article 80 (FIGURE 7) should then enter the station A, the feeding of the articles along the trough is temporarily stopped ($i_7$). At the same time in accordance with the deficiency in at least one station an intermediate signal $i_3$ is given so that the article 80 enters the empty station B. By this transfer of the article 80 the station A is empty again and the vibrating movement of the trough 7 is started again.

If starting from $i_2$, after the stations containing an article have transferred their contents to lower stations, the stations A, B and C should be empty, an article having entered the station A is passed by way of the station B to the station C by the control system delivering the signals $i_3$ and $i_4$ in rapid succession. A second article supplied to the station A within the same delivery cycle of the final station D is similarly passed down.

If the average supply per time unit through the trough 7 is chosen greater than the number of articles delivered by the final station D per time unit, the irregularity of the spacings between the articles in the trough may be reduced to the empty condition of at least one supply station. However, the empty stations are automatically filled again when a number of articles spaced on the trough by unequal but comparatively slight distances are conveyed to the starting station A.

The embodiment shown in FIGURE 8 similarly comprises an equal number of stations A, B, C and D. The intermediate stations B and C and the final station D are constituted by three funnels 59, 60 and 61 between which are interposed partitions adapted to be removed by rotary magnets 62, 63 and 64 respectively. In the station shown the partitions together with the funnels form stations for temporarily storing articles 56, 57 and 58 respectively in the form of filaments. The articles are disposed more or less vertically in these stations. A curved guide tube 65 opens onto an intermittently rotatable transport roller 66 provided with grooves 68. Above the funnel 59 is arraged a guide tube 69 through which filaments fed by a vibrating trough 70 are supplied according to an arrow 71. Photoelectric members 72 are capable of detecting or perceiving a passing article. A pipe 75 connected to a blower system is arranged so as to enable a filament 76 to be blown through the tube 69. The embodiment also includes a control system 4 using similar input and output signals as the control mechanism of the apparatus shown in FIGURES 1 to 4.

The starting station A is located at the end of the trough 70. When an article fed forward through the trough 70 is perceived by the photo-electric members 72, the vibrating movement for feeding the articles is stopped in a manner similar to that used in the apparatus shown in FIGURE 1 ($i_7$) and the article (76) remains stationary near the members 72. The article present in the starting station is removed therefrom with the aid of a signal $i_3$ produced by the control mechanism 4. This signal is converted into an air stream emerging from the pipe 75 for a short period of time.

Otherwise the operation of the apparatus shown in FIGURE 8 is entirely similar to that of the apparatus shown in FIGURES 1 and 2.

What is claimed is:

An apparatus for conveying a plurality of identical articles and for delivering the same individually to a holder at spaced locations thereon comprising a starting station at one end of a path along which a stream of substantially unequally spaced articles may be fed, a multiplicity of intermediate stations for holding single articles and a final station for receiving a single article and deliverying the same to said holder at equal intervals of time, means for permitting said starting and intermediate stations to temporarily hold an article in the succession stream and passing the article on to the next station only when the succeeding or final station is empty, and further means for stopping the stream of articles along said path whenever an article of said stream has entered the starting station and maintaining this stationary condition amongst the articles to be conveyed until the starting station has delivered the article to the next intermediate position, said holder being a movable roller having spaced notches in the periphery thereof, and a pivoting receptacle located between said final station and said holder having individual articles deposited therein from said final station, said individual articles being delivered to selected notches in said roller when said receptacle pivots in synchronism with said movable roller.

References Cited by the Examiner

UNITED STATES PATENTS

| | | | |
|---|---|---|---|
| 2,193,942 | 3/40 | Shackelford | 193—32 X |
| 2,595,022 | 4/52 | Temple | 198—34 |
| 2,647,670 | 8/53 | Cox | 193—7 X |
| 2,858,008 | 10/58 | Dilts. | |
| 3,062,391 | 11/62 | Francois | 214—11 |

SAMUEL F. COLEMAN, *Primary Examiner.*

EDWARD A. SROKA, ERNEST A. FALLER,
*Examiners.*